July 23, 1957 R. H. MATHES 2,800,607
WEDGE SWEEP GENERATOR
Filed May 18, 1948
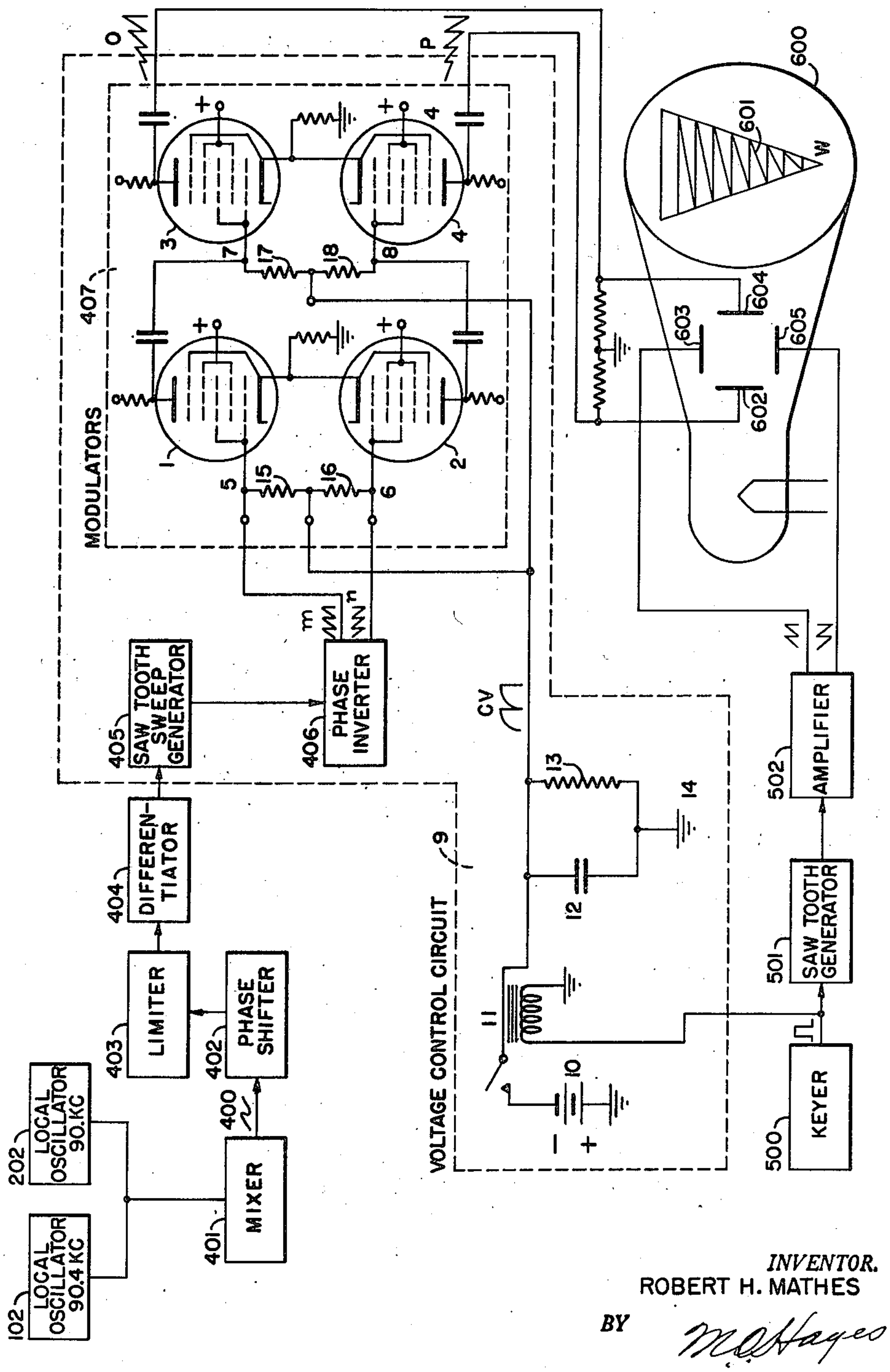
INVENTOR.
ROBERT H. MATHES
BY M. O. Hayes
ATTORNEY United States Patent Office 2,800,607

Patented July 23, 1957

2,800,607

WEDGE SWEEP GENERATOR

Robert H. Mathes, Washington, D. C.

Application May 18, 1948, Serial No. 27,815

6 Claims. (Cl. 315—24)

(Granted under Title 35, U. S. Code (1952), sec. 266)

My invention relates in general to cathode ray tube indicator systems and in particular to a wedge sweep generator for producing a wedge scan or raster on a cathode ray tube indicator for a locator system such as described in the co-pending application of H. L. Saxton, Serial No. 16,893, filed March 25, 1948. My invention is a further improvement on the co-pending application of H. L. Saxton and M. S. Wilson, Serial No. 16,894, also filed March 25, 1948 for obtaining the wedge scan or raster disclosed therein.

In the aformentioned co-pending application of H. L. Saxton and M. S. Wilson there is disclosed a cathode ray tube indicator to be employed in the said locator system of H. L. Saxton, supra, whereby a wedge shaped television raster or scan is produced on the cathode ray indicator to thereby reproduce the true aspect of a detected target.

The present invention provides a novel method and means for horizontally sweeping the electron beam of a cathode ray tube indicator to produce the wedge shaped raster as disclosed in H. L. Saxton and M. S. Wilson, supra.

It is accordingly an object of this invention to provide a new and simplified sweep generator to produce a wedge shaped television raster on a cathode ray tube indicator.

Further objects and attainments of the present invention will become apparent upon a careful consideration of the following detailed description when read in conjunction with the accompanying drawings, in which, the single figure illustrates my invention as applied to the aforementioned locator system.

The signal locator system of H. L. Saxton is fully described in the above identified co-pending application, and further detailed description thereof is unnecessary. Very briefly, however, there is employed in the locator system left and right directional ovelapping zones of reception. Each zone of reception has associated therewith a separate superheterodyne receiving channel including separate local oscillators. The local oscillators of the left and right receiving channels are tuned to distinct frequencies whereby the receiving channels are endowed with distinct intermediate frequencies.

As further taught in the Saxton application supra, object bearing is indicated from a horizontal scan on the cathode ray tube indicator 600. The production of this trace, and the apparatus used therefor, may briefly be described with reference to the numerals in the 400 series in the drawing. More particularly, oscillator 102 is the local oscillator of the right superheterodyne receiving channel, and and oscillator 202 is the local oscillator of the left superheterodyne receiving channel. These two local oscillators, as above indicated, are tuned to distinct frequencies, and their respective outputs are heterodyned together in a suitable mixer 401. By way of example, oscillator 102 is tuned to 90.4 kc. and oscillator 202 is tuned to 90 kc. The resulting 400 cycle frequency difference output from mixer 401 is fed through a phase shifter 402, a limiter 403, a differentiator 404 and then to a saw-tooth generator 405.

The use of the 400 cycle difference frequency as a reference phase and the comparison of the phase of this signal with the phase of the incoming signals as a means of determining the relative position of an object is fully described in the aformentioned Saxton application. Further emphasis is not needed here as it forms no part of the present invention.

To indicate object range the 400 cycle horizontal bearing trace is stretched out in a vertical plane to produce a television like rectangular raster.

The rectangular raster has been a recognized limiting factor of the system, due to the distortion of the aspect of the target, and as stated in H. L. Saxton and M. S. Wilson, supra, if the wedge shape of the zones of reception were duplicated in the form of a wedge shaped raster on the cathode ray indicator the aspect of a detected target would be indicated correctly. It is, as aforementioned, one of the primary objects of the present invention to improve and simplify the method and means of obtaining a wedge shaped television like raster.

The components designated by reference characters of the 500 series are to indicate object range and comprise a keying circuit 500 operative to produce synchronizing impulses for producing simultaneous operation of the transmitter (not illustrated), and range sweep generator 501. The voltage from saw-tooth generator 501 is amplified by amplifier 502 and applied as a push-pull deflection signal to the vertical deflecting plates 603 and 605 of cathode ray indicator 600. This current is so synchronized with the transmission of the search pulses that the horizontal lines are deflected to the bottom of the screen of cathode ray indicator 600 at the instant of the pulse transmission and thereafter progress upward. The vertical displacement from the bottom of the screen is, therefore, proportional to range.

The keying circuit 500, as previously described, is operative to produce synchronizing impulses for simultaneous operation of the transmitter and the range sweep generator 501. This same impulse is utilized in the present feature of the invention, consistent with presenting a wedge scan on the cathode ray tube indicator, to energize the relay 11. This energy closes the contacts of the relay 11 and allows a negative voltage, from the voltage source 10, to become stored or charged in the condenser 12. At the termination of the impulse from the keying circuit 500 the contacts at the relay open and allow the condenser 12 to discharge through the bleeder resistor 13. This condenser discharge produces a logarithmic voltage time curve *cv*, which is introduced in parallel to the grids of the push-pull cascade modulator indicated in general at 407.

In the description of the locator system of H. L. Saxton, supra, the horizontal sweep voltage for the cathode ray tube indicator was derived directly from the saw-tooth sweep generator 405. With the preferred embodiment of the present invention, the horizontal sweep voltage *m* and *n* is applied, through phase inverter 406, to control grid 5 of tube 1 and to the control grid 6 of tube 2 in the push-pull cascade modulator 407. The logarithmic voltage time curve *cv* is at the potential of the voltage source 10 at the initial point of discharge of the condenser 12 and as the condenser 12 discharges, going less negative, the voltage time curve *cv* uniformly varies the amplitude of the saw-tooth wave forms *m* and *n*, producing wave forms *o* and *p*.

It has been found that certain vacuum tubes, and particularly the pentagrid commercially designated 6L7, possess a logarithmic gain variation with bias variation. By the present invention advantage is taken of this characteristic to produce the uniformly varying amplitude saw-tooth signal *o* and *p*. To this end the gain control circuit was designed, the values of the condenser 12 and the resistor 13 being empirically chosen, to give a logarithmic voltage output *cv*, rather than the conventional linear output. The logarithmic voltage output *cv* exactly balances the logarithmic gain characteristic of the modulators 407 to produce the linearly varying outputs *o* and *p*.

The modulators 407 comprise electronic vacuum tubes 1 and 2 in push-pull, 3 and 4 also in push-pull and in cascade with 1 and 2. A single ended modulator caused undesirable distortion which tended to give an unsymmetrical wedge. The modulators in push-pull, as employed in the preferred embodiment, will give a symmetrical wedge and a balanced output, while operating in the conventional manner. The cascade system of push-pull modulators is adapted so that each stage works over a smaller range and accordingly has a more logarithmic gain characteristic with linear change in grid bias. Again and as above indicated, the logarithmic characteristic of the modulator is balanced out by the logarithmic gain control voltage *cv* applied in parallel to the control grids 5, 6, 7 and 8 of tubes 1, 2, 3 and 4, respectively. Hence with the balancing of the logarithmic gain characteristic the modulators provide a linear gain versus time.

With the logarithmic voltage curve *cv* as the modulating voltage, the horizontal saw-tooth wave forms *m* and *n* are modulated in the modulator 407 to provide an increasing in amplitude linearly modulated saw-tooth wave forms *o* and *p*. The modulated saw-tooth wave forms *o* and *p* are coupled to the horizontal plates 602 and 604 of the cathode ray tube indicator 600 to produce a 400 cycle sweep trace thereon, varying in amplitude linearly, and in uniformity with the vertical electron beam deflection.

The keying circuit 500 is a means for synchronizing the transmission of impulses simultaneously with that of the vertical deflection, and as was explained, this same impulse is utilized to energize the relay 11 of the voltage control circuit 9. The vertical deflection is thereby synchronously sweeping in time with the discharge of condenser 12. Through these simultaneous actions a wedge shaped raster or scan 601 is produced on the fluorescent screen of the cathode ray tube indicator 600.

The voltage of the negative voltage source 10 determines the initial voltage on the modulators and hence the point at which the wedge shaped raster 601 will start. The bleeder resistor 13 determines the rate of change of bias on the modulators and consequently the expansion rate of the wedge.

Referring specifically to the raster 601, of cathode ray tube indicator 600, an illustration may be shown of the modulated saw-tooth wave form varying in amplitude to produce the wedge shaped raster. It must be understood that since the horizontal sweep is 400 cycles per second or more, depending on the difference in local oscillator frequency, there is no line definition on the fluorescent screen and during normal operation the screen is blanked except for the occurrence of an echo. For sake of illustration, the raster 601 is shown as a saw-tooth wave form varying in amplitude linearly to provide the wedge shaped raster. The lower apex of the wedge corresponds in time to the instant relay 11 is closed. At this instant the amplitude of wave forms *o* and *p* are practically zero, as the condenser is at the voltage of the voltage source 10 and consequently the modulators 407 are at a very low gain. As the condenser discharges, going less negative, the gain of the modulators 407 increases, and correspondingly increases in amplitude the wave forms *o* and *p* sweeping at a frequency much greater than the voltage control signal *cv*. These horizontal traces are stretched out in a vertical plane, in a manner previously described, to produce the wedge shaped raster 601.

Although I have shown and described a specific embodiment of the present invention it must be understood that many modifications are possible thereof without departing from the true spirit of the invention as well understood by those skilled in the art.

The invention described herein may be manufactured and used by or for the Government of the United States of America for governmental purposes without the payment of any royalties thereon or therefor.

What is claimed is:

1. In a signal locator system, a cathode ray tube indicator, means including a low frequency sweep circuit for deflecting the electron beam of said cathode ray tube in one direction, and means including a high frequency sweep circuit for simultaneously deflecting said electron beam in a second direction substantially at right angles to said one direction, said last named means including a modulator circuit comprising a plurality of push-pull modulator tubes connected in cascade and having a logarithmic gain characteristic, a logarithmic voltage generator operative to produce a logarithmically varying output voltage in synchronism with the low frequency deflection of said beam, and means coupling the output of said logarithmic voltage generator to said modulator tubes to control the gain thereof.

2. In a signal locator system, a cathode ray tube indicator, means including a low frequency saw-tooth generator for deflecting the electron beam of said cathode ray tube in one direction, and means including a high frequency saw-tooth generator for simultaneously deflecting said electron beam in a second direction substantially at right angles to said one direction, said last named means further including a modulator circuit comprising a plurality of push-pull modulator tubes connected in cascade and having a logarithmic gain characteristic, a logarithmic voltage generator operative to produce a logarithmically varying output voltage in synchronism with the low frequency deflection of said beam, and means coupling the output of said logarithmic voltage generator to said modulator tubes to control the gain thereof.

3. In a signal locator system; a cathode ray tube indicator; and cathode ray beam deflection means coupled to said tube for producing a wedge-shaped raster on the screen thereof comprising means for deflecting the beam of said tube in one direction including a low frequency sawtooth voltage generator, means for generating high frequency sawtooth voltages of substantially constant amplitude, means for linearly increasing the amplitude of said high frequency voltages including a modulator circuit coupled to said high frequency generator means and including a plurality of push-pull modulator tubes connected in cascade and having a logarithmic gain characteristic, a logarithmic voltage generator for producing a logarithmically varying voltage in synchronism with said low frequency sawtooth voltage, means supplying said logarithmically varying voltage to said modulator tubes to control the gain thereof, and means responsive to said linearly varying high frequency voltages to deflect said beam normal to said one direction.

4. In a signal locator system; a cathode ray tube indicator; and cathode ray beam deflection means coupled to said tube for producing a wedge-shaped raster on the screen thereof comprising means for generating a low frequency sawtooth voltage to deflect the beam of said tube in one direction, keyer means coupled to said low frequency means to initiate voltage output therefrom, means for generating high frequency sawtooth voltages of substantially constant amplitude, means for linearly increasing the amplitude of said high frequency sawtooth voltages including a modulator circuit coupled to said high frequency means and including a plurality of push-pull modulator tubes connected in cascade and having a logarithmic gain characteristic, a logarithmic voltage generator coupled to said keyer and responsive to a keying pulse therefrom to supply in synchronism with said low frequency voltage a logarithmically varying voltage to said modulator circuit to control the gain thereof, and means responsive to said linearly varying high frequency voltages to deflect said beam normal to said one direction.

5. In a locator system substantially as set forth in claim 4 wherein said logarithmic voltage generator comprises a resistance-capacitance circuit, a voltage source, means responsive to said keyer pulse to couple said source to said capacitance in the interval defined by said pulse, the discharge of said capacitance through said resistance producing a logarithmically varying output voltage, means coupling said logarithmically varying voltage to said modulator tubes to control the gain thereof, the time constant of said resistance-capacitance circuit being such that said logarithmically varying voltage compensates for the logarithmic gain characteristics of said tubes whereby to import a linearly increasing gain characteristic to said modulator circuit.

6. In a cathode ray beam deflection system for producing a wedge-shaped raster on the screen of a cathode ray tube indicator, means for deflecting the beam of said tube in one direction at a low frequency rate, and means for deflecting the beam of said tube in a direction normal to said one direction at a high frequency rate including a substantially constant amplitude sweep voltage generator, a modulator circuit coupled to the output circuit of said sweep generator and including a plurality of push-pull modulator tubes connected in cascade and having a logarithmic gain characteristic, and a logarithmic voltage generator operative to produce a logarithmically varying output voltage in synchronism with the low frequency deflection of said beam, means for feeding the output of said logarithmic voltage generator to said modulator tube to control the gain thereof.

References Cited in the file of this patent

UNITED STATES PATENTS

| | | |
|---|---|---|
| 2,176,973 | Bowman-Manifold | Oct. 24, 1939 |
| 2,207,389 | Wendt | July 9, 1940 |
| 2,207,499 | Vance | July 9, 1940 |